May 11, 1943.   A. L. PARKER   2,318,964
VALVE ASSEMBLY
Filed March 31, 1941   2 Sheets-Sheet 1
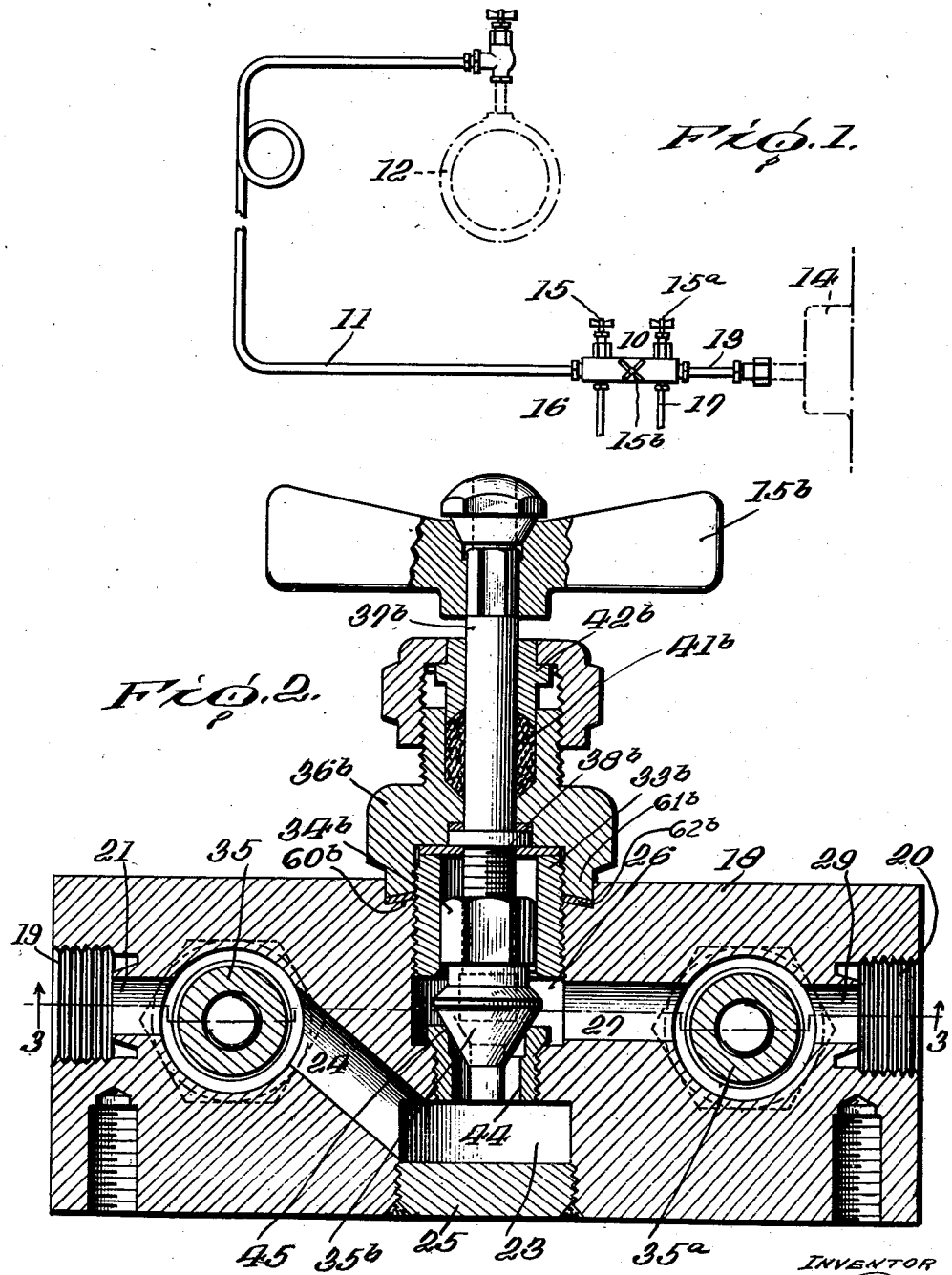

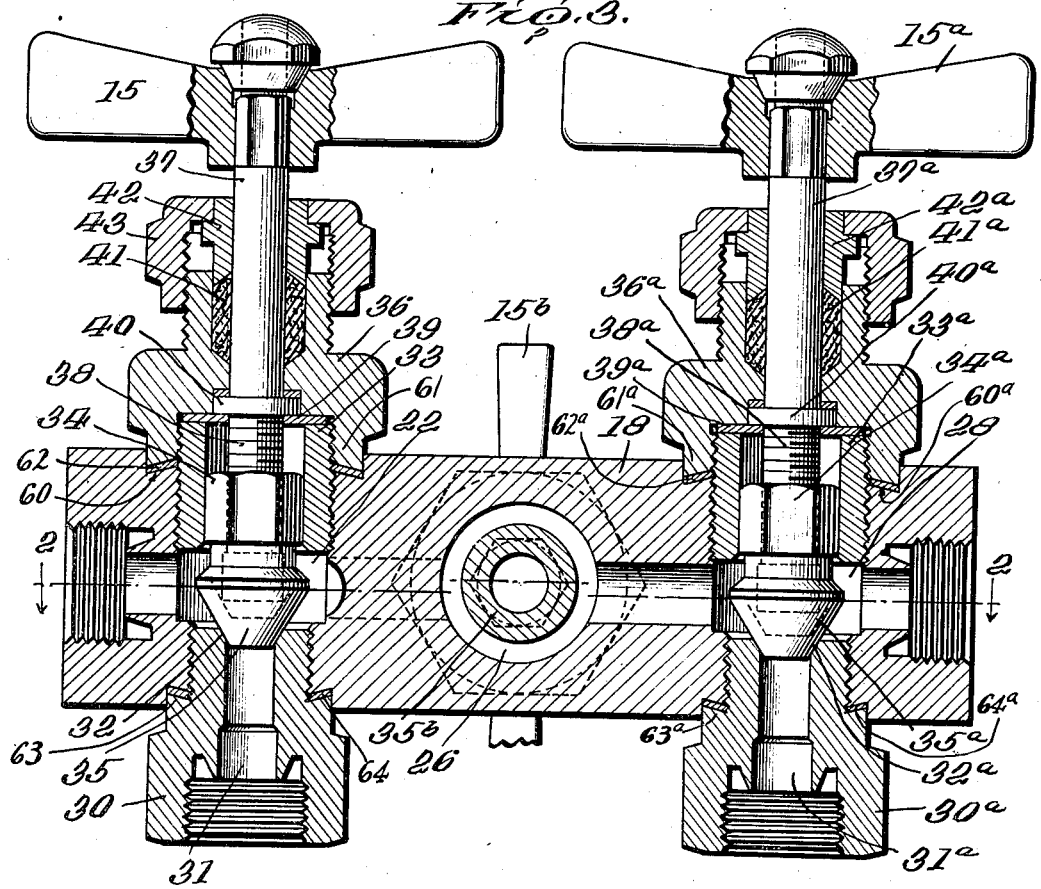

Patented May 11, 1943

2,318,964

UNITED STATES PATENT OFFICE 2,318,964

VALVE ASSEMBLY

Arthur L. Parker, Cleveland, Ohio

Application March 31, 1941, Serial No. 386,198

1 Claim. (Cl. 251—47)

The present invention relates to new and useful improvements in a valve assembly, and more particularly to improvements in valve parts which may be readily assembled in a ported valve body.

An object of the present invention is to provide a valve assembly of the above type which is extremely simple and compact in construction and which can be easily assembled and taken apart for repair purposes or the like.

A further object of the invention is to provide a valve assembly of the above type wherein the valve body supports the valve elements and the valve seats, and wherein the valve seats are formed integral with conduit connectors in order to obviate the necessity of accurately machining the valve body for this purpose.

The above and other objects of the invention will in part be obvious and will be hereinafter more fully pointed out.

In the accompanying drawings:

Figure 1 is a fragmentary diagrammatic view showing one installation of the valve assembly of the present invention.

Figure 2 is an enlarged longitudinal sectional view through the valve assembly and taken along the line 2—2 of Figure 3.

Figure 3 is a similar longitudinal sectional view through the valve assembly and taken substantially along the line 3—3 of Figure 2.

Referring more in detail to the accompanying drawings, and particularly to Figure 1, the valve assembly 10 is illustrated with the body portion thereof communicating with a conduit 11 which has valved communication with a steam main 12. The opposite end of the valve body is connected to a conduit 13 which is illustrated as leading to a steam gauge 14. The valve body supports separable valve means indicated generally by the numerals 15, 15a, 15b. In normal operation of the gauge 14, the valves 15, 15a are closed and the valve 15b is open. When it is desired to blow out the line, the valve 15b is shifted to close communication with the gauge and the valve 15 is opened to permit steam to blow-off through a blow-down conduit 16. When it is desired to test the gauge 14, the valve 15b is closed and the valve 15a is opened to afford communication with a vent conduit or test gauge connection 17. If desired, the conduits 16, 17 may be connected to a trap (not shown) and by-passing of the trap may be accomplished by closing the valves 15, 15a and opening the valve 15b.

In describing the detail construction of the valve assembly, reference will be had particularly to Figures 2 and 3 wherein the valve body 18 is illustrated as being provided with a passage extending substantially longitudinally therethrough from end to end and affording communication between threaded adapter portions 19, 20 at opposite ends thereof. According to the installation of Figure 1, the adapter portion 19 is connected to the conduit 11 and the adapter portion 20 is connected to the conduit 13. The substantially longitudinal passage through the valve body 18 includes a port 21 affording communication between the adapter portion 19 and a bore 22 extending transversely through and across the adjacent end of the valve body. The bore 22 communicates with a chamber 23 through an angular port 24 and one end of the chamber 23 is closed by a plug 25. The opposite end of the chamber 23 communicates with a valve chamber 26 which communicates through a port 27 with a bore 28 also extending transversely through and across the valve body and disposed parallel to the axis of the bore 22. The bore 28 communicates with the adapter portion 20 through a port 29. The chambers 26, 23 in the intermediate portion of the valve body constitute a central bore which extends transversely across the valve body with the axis thereof disposed at right angles to the axes of the parallel bores 22, 28.

One end of the transverse bore 22 is threaded to receive a conduit adapter or tube connector 30 which has a central passage 31 therethrough and a valve seat 32 at the inner end of the passage. Similarly, the transverse bore 28 at the opposite end of the valve body 18 has a conduit adapter 30a with a central passage 31a therethrough and a valve seat 32a at the inner end of the passage. It will thus be seen that one end of each of the parallel transverse bores 22, 28 have a combined conduit connector and valve seat threadedly engaging therein. The opposite end of the bore 22 is threaded to receive an externally threaded bushing 33 which extends outwardly beyond the valve body. The internal surface of the bushing 33 is preferably hexagonal in shape so as to receive an internally recessed and threaded hexagonal member 34 which carries a valve member 35 adapted to cooperate with the valve seat 32 for selectively controlling the passage of fluid. The portion of the bore 22 between the inner ends of the bushing 33 and the adapter 30 thus provides a valve chamber for the valve member 35. The outer threaded end of the bushing 33 is adapted to receive a bonnet 36 through which a valve operating stem 37 extends. The inner end 38 of the stem 37 is threaded to engage the internal threads on the member 34. Between the outer end of the bushing 33 and the bonnet 36, there is provided an annular plate 39 which cooperates with the shoulder 40 on the stem to prevent endwise movement of the stem. A packing 41 is disposed between the stem and the bonnet and a packing follower 42 may be forced against the packing by a packing nut 43.

The valve unit which is mounted in the corresponding end of the bore 28 is identical in construction and the valve member 35a cooperates with the valve seat 32a and is carried by an internally recessed and threaded member 34a having an outer hexagonal surface fitting within the inner hexagonal surface of the bushing 33a. The stem 37a extends through the packing follower 42a, the packing 41a and the bonnet 36a and the inner threaded end 38a thereof is adapted to threadedly engage the inner surface of the member 34a. Endwise movement of the stem 37a is prevented by the flange portion 40a disposed between the adjacent surface of the bonnet 36a and the annular plate 39a. Thus, rotation of either valve stem 37, 37a by means of the handles 15 or 15a, will effect rectilinear movement of the members 34, 34a and the valves carried thereby so as to control the passage of fluid.

The communicating passage between the chambers 23, 26 is formed by a sleeve member 44 which provides a valve seat 45 in the chamber 26. The end of the chamber 26 is internally threaded to receive an externally threaded bushing 33b to which is secured a bonnet 36b. The inner surface of the bushing 33b is preferably hexagonal in shape and is adapted to receive and guide the external hexagonal surface of the member 34b which is internally recessed and threaded to receive the threaded inner end 38b of a valve stem 37b which extends through a packing follower 42b and a packing 41b. Thus, rotation of the stem 37b by the handle portion 15b will effect rectilinear movement of the member 34b within the bushing 33b and corresponding movement of the valve member 35b.

It is to be noted that the body member is shaped to provide countersunk recesses at the opposite ends of the transverse end bores. Similarly, the intermediate bore is provided with such a countersunk recess. The bottom surfaces 60, 60a, and 60b of these recesses are inclined outwardly and downwardly from the bores and the skirt portions 61, 61a, 61b of the bonnets 36, 36a, 36b, respectively, extend therein and the ends are inclined symmetrically with respect to the bottom surfaces of the recesses. Gaskets 62, 62a, 62b are placed between these inclined surfaces which tend to wedge the gaskets into tight fluid sealing engagement with the adjacent parts. The seating of the bonnets in the recesses in the body member serves to prevent any spreading thereof when tightly secured to prevent leakage. The adapters 30, 30a are provided with shoulder portions 63, 63a, respectively, which extend into the recesses at the opposite ends of the transverse end bores. Gaskets 64, 64a are also disposed between similarly inclined surfaces so as to effect a tight seal. The inner ends of the adapters, that is, the ends having the valve seats, are confined and reinforced by the adjacent portions of the body member so that tight contact between the valve elements and the adapter seats will not spread or deform the adapters.

According to the installation of Figure 1, normal operation of the steam gauge 14 is accomplished by shifting the valve members 35, 35a, into contact with the seats 32, 32a, respectively, as shown in Figure 3, thus closing the ports 31, 31a which are adapted to communicate with the conduits 16, 17, respectively. The intermediate valve member 35b is shifted away from the seat 45, as shown by dotted lines in Figure 2, so that fluid will pass from the conduit 11 through the longitudinal passageway in the valve body, then through the conduit 13 to the gauge 14. When it is desired to connect the line to the blow-down conduit 16, the valve member 35b is shifted to a closed position (the full line position of Figure 2) and the valve member 35 is opened as shown by the dotted line position in Figure 3. If it is desired to connect the valve body with the vent conduit 17, the valve member 35a is opened to the dotted line position shown in Figure 3 and the valve member 35b is opened.

It is to be clearly understood that various changes in the details of construction and arrangement of parts may be made without departing from the scope of the invention as set forth in the appended claim.

I claim:

A valve mechanism comprising a body member having a transverse bore therethrough, a sleeve member threaded into said bore adjacent one end thereof and providing a conduit port surrounded by a valve seat at the inner end thereof, a sleeve bushing threaded into the other end of said bore and dimensioned so as to project above the surface of said body member, said body member having a recess surrounding said sleeve, a bonnet having threaded connection with said sleeve bushing and a depending skirt adapted to extend into said recess, the bottom of said recess being inclined upwardly and inwardly and the bottom edge of the skirt of the bonnet being similarly inclined so as to engage and compress a gasket located in the recess, a valve stem mounted in said bonnet and extending through said sleeve bushing and a valve carried by the lower end of said valve stem adapted to engage the valve seat, an annular shoulder on said stem disposed within and cooperating with said bonnet to prevent outward endwise movement of said stem, an annular plate disposed around and immediately underlying said shoulder to prevent inward movement of the stem, said plate being clamped between the projecting end of said bushing and said bonnet, said bushing having means cooperating with the valve stem when said stem is turned for moving said valve to and from said seat.

ARTHUR L. PARKER.